United States Patent
Combs et al.

(10) Patent No.: US 7,190,903 B1
(45) Date of Patent: *Mar. 13, 2007

(54) FIBER AND WIRE COMMUNICATION SYSTEM

(75) Inventors: Charles D. Combs, Buffalo, MO (US); Thomas Edward Darcie, Fairhaven, NJ (US); Bhavesh N. Desai, Livingston, NJ (US); Alan H. Gnauck, Middletown, NJ (US); Xiaolin Lu, Highlands Ranch, NJ (US); Esteban Sandino, Highlands Ranch, CO (US); Oleh J. Sniezko, Littleton, CO (US); Anthony G. Werner, Highlands Ranch, CO (US); Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/630,664

(22) Filed: Jul. 31, 2003

Related U.S. Application Data

(63) Continuation of application No. 09/502,043, filed on Feb. 11, 2000, now Pat. No. 6,751,417, which is a continuation-in-part of application No. 09/460,770, filed on Dec. 14, 1999, now Pat. No. 6,654,563.

(60) Provisional application No. 60/131,421, filed on Apr. 28, 1999, provisional application No. 60/120,373, filed on Feb. 17, 1999.

(51) Int. Cl.
*H04J 14/00* (2006.01)

(52) U.S. Cl. .................... 398/71; 398/70; 398/72; 398/79; 398/66; 398/67; 398/68; 398/100; 455/5.1; 455/3.1; 455/6.1

(58) Field of Classification Search ............... 398/71, 398/70, 72, 79, 66, 67, 68, 100; 455/5.1, 455/3.1, 6.1
See application file for complete search history.

(56) References Cited

U.S. PATENT DOCUMENTS

| 4,441,180 | A | | 4/1984 | Schussler |
| 5,202,780 | A | | 4/1993 | Fussganger |
| 5,521,734 | A | * | 5/1996 | Frigo ..................... 398/139 |
| 5,642,155 | A | | 6/1997 | Cheng |
| 5,864,415 | A | | 1/1999 | Williams et al. |
| 5,864,672 | A | | 1/1999 | Bodeep et al. |

(Continued)

*Primary Examiner*—Hanh Phan

(57) ABSTRACT

This invention provides a new architecture for a communication system between head-ends and end-users which expands bandwidth and reliability of the communication system. A mux-node receives communication signals from a head-end and forwards the received communication signals to one or more mini-fiber nodes. The connection to the head-end is via a small number of optical fibers and the connections to each of the mini-fiber nodes may be via one or more optical fibers that may provide full duplex communication. The head-end may communicate with the mux-node using digital or digital and analog signals. The mini-fiber nodes may combine the signals received from the head-end with loop-back signals used for local media access control prior to forwarding the signals to the end-users. Upstream data are received by the mini-fiber nodes and transmitted to the mux-node. The mux-node may route upstream communication signals received from the mini-fiber nodes as downstream signals to other mini-fiber nodes also connected to the mux-node without head-end interaction.

2 Claims, 9 Drawing Sheets

U.S. PATENT DOCUMENTS

| | | |
|---|---|---|
| 5,864,748 A | 1/1999 | Dail |
| 5,880,863 A * | 3/1999 | Rideout et al. ............... 398/59 |
| 5,880,865 A | 3/1999 | Lu et al. |
| 5,920,410 A | 7/1999 | Smith et al. |
| 6,147,786 A * | 11/2000 | Pan ............................... 398/1 |
| 6,295,148 B1 | 9/2001 | Atlas |
| 6,381,248 B1 | 4/2002 | Lu |
| 6,493,335 B1 | 12/2002 | Darcie et al. |
| 6,523,177 B1 * | 2/2003 | Brown ....................... 725/121 |
| 6,577,414 B1 * | 6/2003 | Feldman et al. ............. 725/129 |
| 6,751,417 B1 * | 6/2004 | Combs et al. ................ 398/71 |

\* cited by examiner

FIBER AND WIRE COMMUNICATION SYSTEM

This application is a continuation of U.S. non-provisional patent application no. 09/502,043, filed Feb. 11, 2000, now U.S. Pat. No. 6,751,417 entitled "Fiber and Wire Communication System," which is a continuation-in-part of U.S. non-provisional patent application Ser. No. 09/460,770, filed Dec. 14, 1999, now U.S. Pat. No. 6,654,563 entitled "Fiber/Wired Communication System." This application also claims the benefit of priority to provisional application No. 60/131,421, filed Apr. 28, 1999, entitled "HFC Architecture in the Making," and provisional application No. 60/120,373, filed Feb. 17, 1999, entitled "Fiber/Wired Communication System." The prior applications noted above are each incorporated herein by reference in its entirety.

BACKGROUND OF THE INVENTION

1. Field of Invention

This invention relates to a communication system that includes fiber optic and wired media.

2. Description of Related Art

Cable communication systems use optical fibers to transmit information between a head-end and a fiber node and use coaxial cable to transmit information between the fiber node and end-users. With increasing need for greater capacity, current systems are stressed to their limits. Thus, there is need for new technology to increase capabilities of communication between head-ends and end-users.

SUMMARY OF THE INVENTION

This invention provides a new architecture for a communication system between head-ends and end-users that expands capacity, simplifies transmission and operation, increases reliability and reduces cost of the communication system. One or more mux-nodes in the new architecture receive communication signals from a head-end and forward the received communication signals to one or more mini-fiber nodes (mFNs). The mFNs provide full duplex communication to the end-users. The head-end may include primary hubs that provide connectivity among all end-users of the communication system. The primary hubs also serve as information sources providing services such as TV broadcast signals. The head-end may also include secondary hubs that perform functions such as optical signal distribution and system recovery.

The head-end may be connected to one or more mux-nodes where each of the mux-nodes are connected to the head-end via a small number of optical fibers (preferably two or four). A mux-node may be connected to one or more mFNs via one or more optical fibers, and each of the mFNs may be connected to one or more end-users via passive wired connections such as coaxial lines. In this way, the number of connections to the head-end may be much smaller than if mFNs are connected directly to the head-end without the mux-node.

The communication between the head-end and the mux-node may include analog and digital signals. Digital signals may include digital base band signals (1s and 0s) as well as digital signals modulated onto radio frequency (RF) sub-carriers (RF digital signals). The analog signals may also include the RF digital signals as well as pure analog signals such as TV broadcast signals.

When the analog and digital signals are received together, the mux-node separates the analog signals from the digital signals. The analog signals may be narrowcast signals that are destined to end-users of selected mFNs, for example. The digital signals may be multiplexed using a multiplexing scheme such as time division multiplexing (TDM). The digital signals destined to specific end-users may be demultiplexed and transmitted to the destined end-users through the mFNs that serve the respective end-users. The narrowcast analog signals for each mFN may be combined with digital signals prior to transmitting to the respective mFNs. Each of the mFNs receives the analog and digital signals, modulates these signals onto appropriate RF bands and transmits the signals to the end-users via the passive wired connection.

Upstream RF signals may be received by the mFNs via the passive wired connections from the end-users. The RF signals may include pure analog and RF digital signals. The mFNs may convert some or all of the upstream RF digital signals into digital base band signals for transmission to the mux-node. Alternatively, the mFNs may transmit the RF digital signals directly to the mux-node and the mux-node may perform the RF digital to digital base band conversion.

The analog and digital upstream signals may be transmitted to the mux-node using either multiple optical fibers or wavelength division multiplexing (WDM), for example. The mux-node may RF combine the analog upstream signals from all the mFNs for transmission to the head-end. The RF combining may be performed by either adding the RF signals received from the mFNs together or by frequency division multiplexing the RF signals. The upstream digital signals are processed by the mux-node. Those signals that are destined to the head-end are multiplexed using TDM, for example, and transmitted to the head-end. The analog signals and the multiplexed digital signals may be transmitted to the head-end using wavelength division multiplexing (WDM) or dense wavelength division multiplexing (DWDM), for example.

The mux-node may receive communication signals from end-users through the mFNs that are destined to other end-users connected to the mFNs being served by the same mux-node. In this situation, the mux-node may route the communication signals among mFNs without forwarding the information to the head-end. In addition, routing functions may be performed in the mFNs also. For example, the mFNs may detect that a communication is destined to one of the end-users also connected to the same mFN and route the communication to the end-user without processing by the respective mux-node. The mFNs may also assist the routing process by labeling or adding information to upstream communications so that routing tasks may be simplified at the mux-node, for example. In this way, communication traffic between the mux-node and the head-end may be reduced with corresponding increase in efficiency.

Reliability is increased because the mux-node reduces the number of optical fibers required to be connected to the head-end. The reliability is further increased because a greater distance is spanned by a smaller number of optical fibers between the head-end and the mux-node than distances spanned by a larger number of optical fibers between the mux-node and the mFNs. The wired connections to the end-users are passive and do not include active devices such as amplifiers and thus reduce power consumption and lengthen mean-time-to-failure (MTTF). The small number of optical fibers to the head-end and the lower power consumption of the wired connections shorten the mean-time-to-repair (MTTR) and reduce cost of the communication system.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
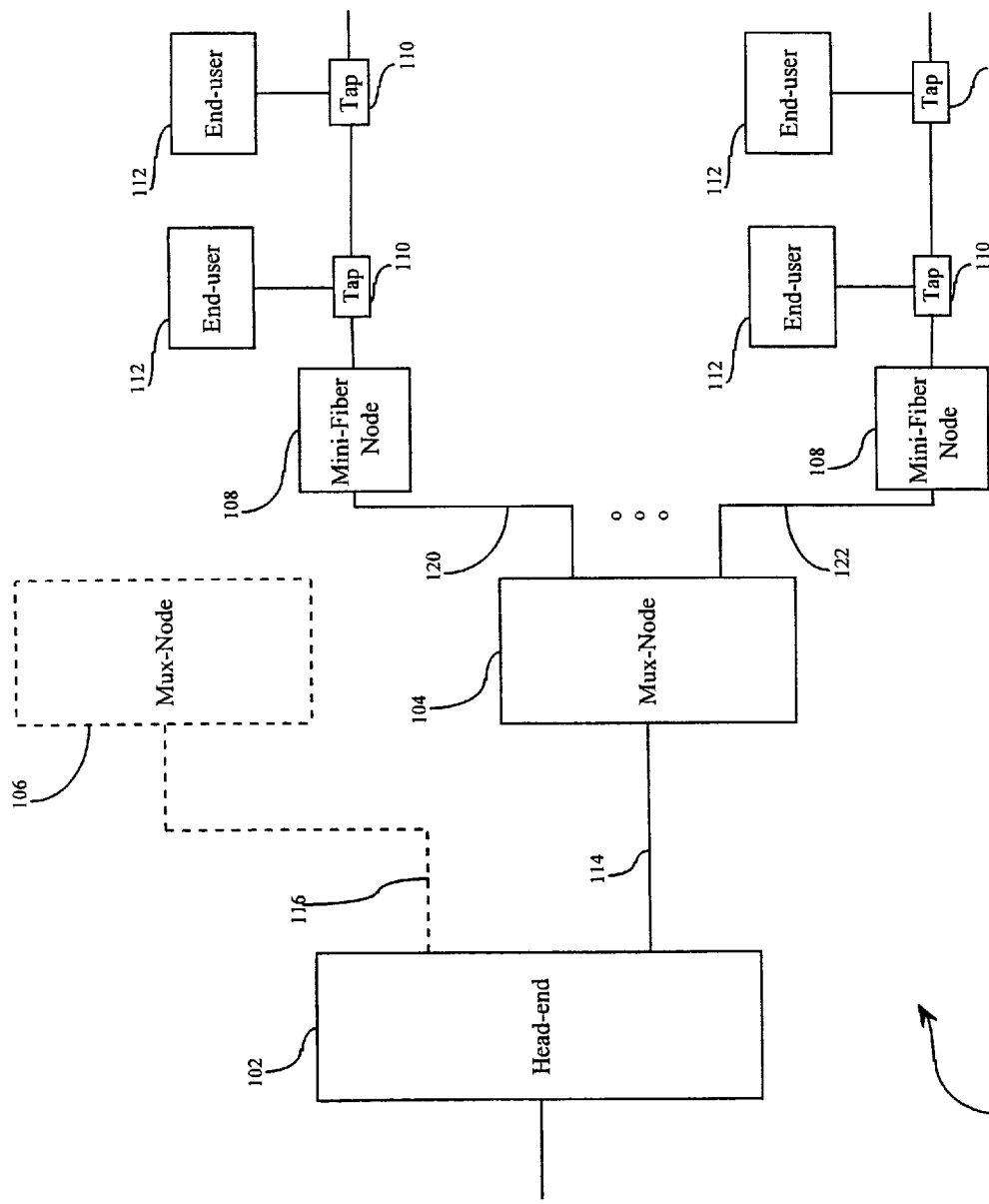
FIG. 1 shows an exemplary block diagram of a communication system between a head-end and end-users.

FIG. 1 shows an exemplary block diagram of a communication system 100 that includes a head-end 102, mux-nodes 104–106, mini-fiber nodes (mFNs) 108 and end-users 112. The mux-nodes 104–106 are connected to the head-end 102 via one or more optical fiber trunks 114–116, the mFNs 108 are connected to the mux-node 104 via optical fiber trunks 120–122 and the end-users 112 are connected to the mFNs 108 via passive wired connections such as coaxial lines via taps 110. Each of the optical fiber trunks 114–116 and 120–122 may include one or more optical fibers.

The head-end 102 may include primary hubs and secondary hubs (not shown) that form interconnected regional service facilities. The primary hubs may include a source of broadcast information such as TV broadcast signals and may have overall control of the communication system 100. Communication among the end-users 112 serviced by different mux-nodes 104–106 may be provided via the primary hubs because end-users 112 are reachable via the primary hubs. The secondary hubs may provide optical signal amplification, switching and distribution. The secondary hubs may perform the above function without optical to electrical conversion. For simplicity of the following discussion, "head-end" is used to include concepts such as primary and secondary hubs as well as less complex facilities or other alternatives that enable information distribution.

The head-end 102 may transmit to the mux-nodes 104–106 first downstream signals that contain both broadcast and/or narrowcast information such as analog TV signals and/or cable modem signals, for example. The head-end 102 may transmit different first downstream signals to different ones of the mux-nodes 104–106 so that each mFN 108 may potentially receive a unique first downstream signal.

The head-end 102 may transmit a second downstream signal containing digital information to the mux-nodes 104–106. The digital information may be digital base band signals (i.e., 1s and 0s) that are destined to particular end-users 112. The digital signals may be multiplexed using schemes such as time division multiplexing (TDM). The mux-node 104–106 demultiplexes the digital information (e.g., TDM) and routes the digital information to destination end-users 112 via appropriate mFNs 108.

The end-users 112 may send upstream signals. The upstream signals from the end-users 112 may include multiple types of signals including analog signals and radio frequency (RF) digital signals, which are digital signals modulated onto sub-carriers, for example. The upstream signals from the end-users 112 may be transmitted in different RF bands. The mFNs 108 receive and split the upstream signals into analog signals which may include some RF digital signals that are not demodulated and digital signals which are to be demodulated into digital base band signals and forward the analog and digital signals to the mux-node 104–106 via frequency division multiplexing (FDM), WDM, DWDM, spatial division multiplexing (SDM), e.g., multiple fibers, etc. The mux-nodes 104–106 may send the analog signals received from the mFNs 108 directly to the head-end 102 using WDM or RF combine the analog upstream signals from some or all the mFNs 108 via frequency conversion, for example, and forward the frequency converted signals to the head-end. The digital upstream signals may be multiplexed via TDM, for example, and the multiplexed signals transmitted to the head-end 102.

Media access control (MAC) may be performed by any available technique. For example, the end-users 112 may control access among themselves via an out-of-band control channel or end-users 112 may send MAC signals upstream for access privileges. The mux-nodes 104–106 may perform MAC functions for local media access control either autonomously from the head-end or based on control parameters specified by the head-end. MAC may also be performed by the head-end 102 completely in a centralized manner. Any combination of the above MAC techniques may be possible where the MAC functions are distributed among the communication system components.

As mentioned above, each of the optical fiber trunks 120–122 may include one or more optical fibers. If two optical fibers are included, for example, then one optical fiber may be dedicated for upstream communication and another optical fiber may be dedicated for downstream communication. Alternatively, one optical fiber may be dedicated for analog communication while another optical fiber may be dedicated for digital communication. A further alternative could be to allocate one fiber for downstream analog signals transmissions and the second fiber for upstream analog signal transmission plus digital base band transmission. This final alternative may enable the stringent requirements for analog CATV signals to be met. Any of the fibers may be used with wavelength division multiplexing (WDM) to form any number of channels for half duplex or full duplex communication.

The above-described communication system 100 provides for added efficiency via the mux-nodes 104–106. Instead of connecting each of the mFNs 108 directly to the head-end 102 via one or more optical fibers, many mFNs 108 are connected to the mux-nodes 104–106 via the optical fiber trunks 120–122. The mux-node 104–106 multiplexes the digital communication signals from all the mFNs 108 using TDM or other concentration mechanisms such as FDM, DWDM, SDM, for example. The mux-node 104–106 outputs the multiplexed signal to the head-end 102 via the optical fiber trunks 114–116 which may contain a much smaller number of optical fibers. Thus, the mux-nodes 104–106 reduce the number of fibers that is needed to extend communication signals between the mFNs 108 and the head-end 102.

In addition, the wavelength tolerance for the optical fiber trunks 120–122 may be less stringent than the wavelength tolerance for the optical fiber trunks 114–116. The optical fiber trunks 114–116 interface with secondary hubs, for example, and to conserve wavelength space, tight wavelength tolerances may be assigned to each of the mux-nodes 104–106 so that WDM may be used. The tight tolerance requires very accurate and precise light generators such as carefully selected lasers which are very costly. The mux-node interface with the mFNs 108 does not need to have such a tight wavelength tolerance. Thus, less costly lasers may be used for interfacing with the mFNs 108 and in the mFNs 108 themselves. If mFNs 108 interface directly with the secondary hubs without the mux-node 104–106, then the lasers in the mFNs 108 must meet the tight wavelength tolerance requirement with attendant costs. Because the mux-node 104–106 combines the upstream signals received from the mFNs 108 into a smaller number of signals (through a combination of TDM, frequency stacking or RF combining, for example), the mux-node 104–106 reduces the over all cost of the communication system 100.

The mux-nodes 104–106 may be physically separated from the head-end 102 at a distance that is greater than distances separating the mux-node 104–106 and the mFNs 108. This physical arrangement reduces the number of optical fibers spanning long distances to a smaller value than the number of optical fibers spanning shorter distances. For example, mux-nodes 104–106 and mFNs 108 may be placed near end-user sites with distances of about one kilometer or less, while the mux-nodes 104–106 may be separated from the secondary hubs by more than one kilometer. In this way, reliability of the system 100 is improved and the mean-time-to-repair (MTTR) is decreased due to a smaller number of optical fibers spanning relatively long distances.

Moreover, the mux-nodes 104–106 may also perform routing functions among the mFNs 108. For example, if a communication signal received from a first mFN 108 is destined for an end-user 112 that may be reached via a second mFN 108 also connected to the same mux-node 104–106, the mux-node 104–106 may route the communication signal directly to the destination end-user 112 without forwarding the communication signal to the head-end 102. In this way, the communication load of the head-end 102 may be reduced.

Figure 2:
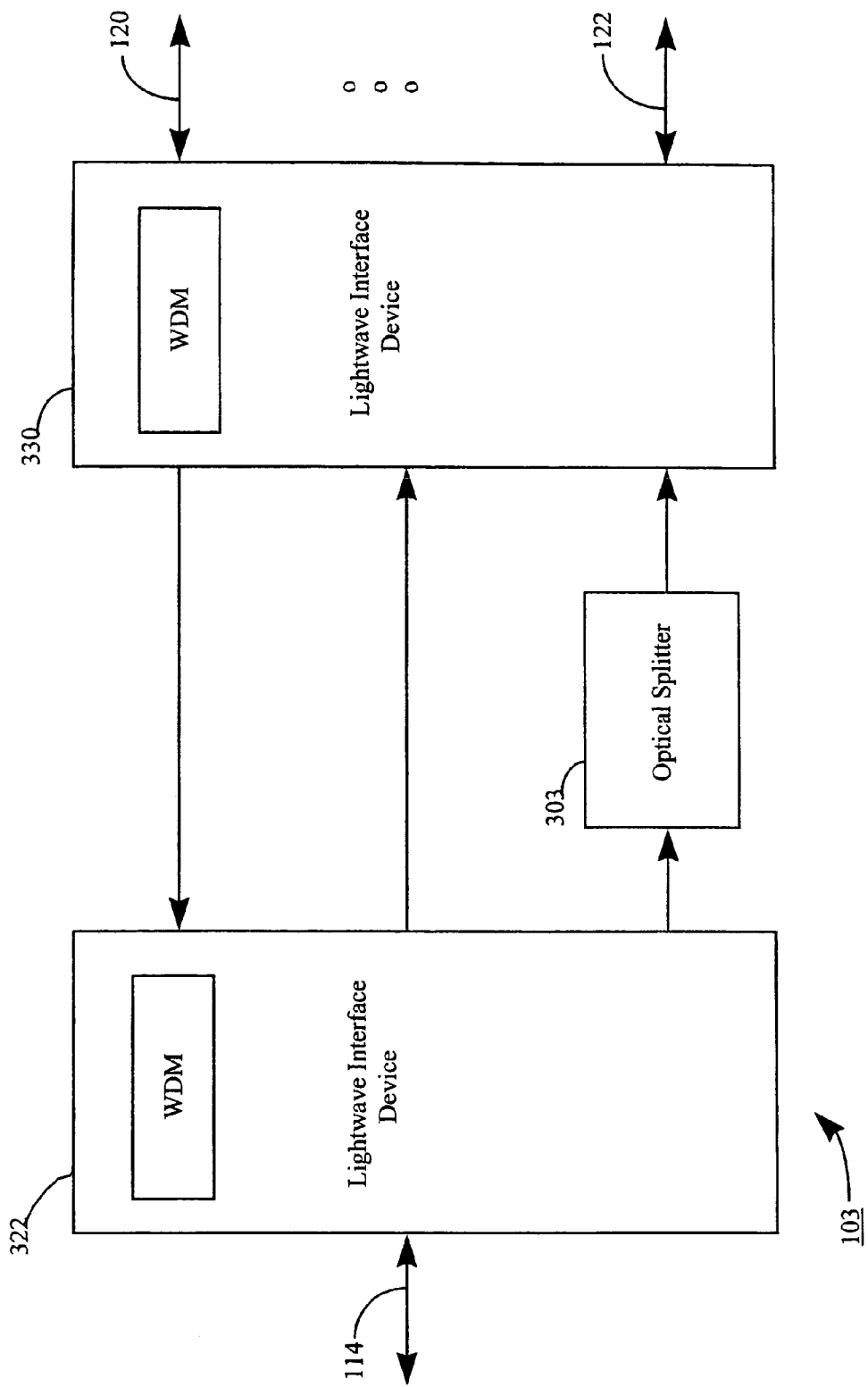
FIG. 2 shows a first exemplary block diagram of a mux-node.

FIG. 2 shows an exemplary functional block diagram of a first example of the mux-node 104 (herein after referred to as the first mux-node 103) that uses WDM for fiber concentration. The first mux-node 104 includes a lightwave interface device 322 that performs WDM, an optical splitter 303 and a lightwave interface device 330 that also performs WDM. The lightwave interface device 322 is coupled to the head-end 102 via optical fiber trunk 114 and the lightwave interface device 330 is coupled to the mFNs 108 via optical fiber trunks 120–122.

The lightwave interface device 322 receives the first downstream signals from the head-end 102 and passes optically the first downstream signals to the optical splitter 303. The optical splitter 303 splits optically the first downstream signals into a number of optical signals that match a number of mFNs 108 associated with the first mux-node 103. The output of the optical splitter 303 is transmitted directly to each of the mFNs 108. The second downstream signals are forwarded directly from the lightwave interface device 322 to the lightwave interface device 330 for transmission to the mFNs 108. Upstream signals are received by the first mux-node 104 from the mFNs 108 in the lightwave interface device 330 and sent directly to the lightwave interface device 322 for forwarding to the head-end 102.

Figure 3:
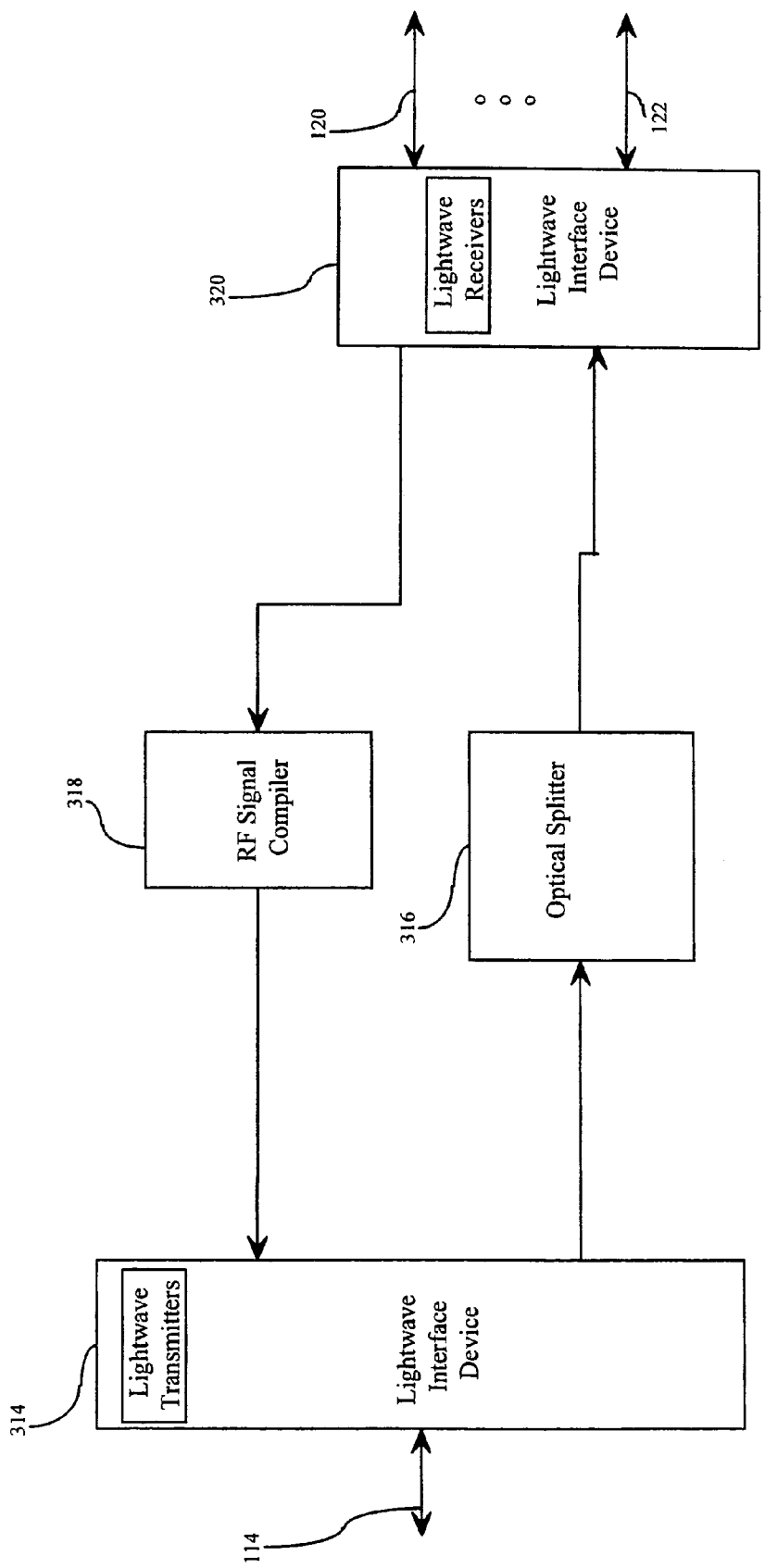
FIG. 3 shows a second exemplary block diagram of the mux-node.

FIG. 3 shows an exemplary functional block diagram of a second example of the mux-node 104 (herein referred to as the second mux-node 105). The second mux-node 105 includes the lightwave interface device 314 connected to the head-end 102 via the optical fiber trunk 114, an optical splitter 316, an optional RF signal compiler 318 and the lightwave interface device 320. The lightwave interface device 314 includes one or more lightwave transmitters for transmitting lightwaves to the optical fiber trunk 114 and the lightwave interface device 320 includes lightwave receivers for receiving lightwaves from the optical fiber trunks 120–122. The first and second downstream signals are sent optically to the optical splitter 316. The optical splitter 316 splits optically both the first and second downstream signals into a number of optical signals that match a number of mFNs 108 associated with the first mux-node 104. The output of the optical splitter 316 is transmitted directly to each of the mFNs 108 via the optical fiber trunks 120–122.

The upstream signals from the end-users 112 include RF signals which are received by respective ones of the mFNs 108. The mFNs 108 modulate these upstream signals onto optical sources (or carriers) and transmit the optical signals to the lightwave receivers of the lightwave interface device 320. The lightwave interface device 320 receives the optical upstream signals, converts the received optical signals to RF signals and sends the RF signals to the RF signal compiler 318 (if used). The RF signal compiler 318 combines the RF signals by either adding the RF signals together, frequency division multiplexing (FDM—frequency stacking) the RF signals or adding signals from subsets of the mFNs 108 and FDMing the sum, for example.

The RF signal compiler 318 sends the compiled RF signals to the one or more lightwave transmitters of the lightwave interface device 314. The lightwave transmitters of the lightwave interface device 314 convert the compiled RF signals into optical signals and transmit the optical signals to the head-end 102 via the optical fiber trunk 114. If the RF signal compiler 318 is not used, then the RF signals may be sent directly to the lightwave interface device 314 which transmits each of the RF signals on an individual wavelength using WDM, for example, to the head-end 102 via the lightwave transmitters.

Figure 4:
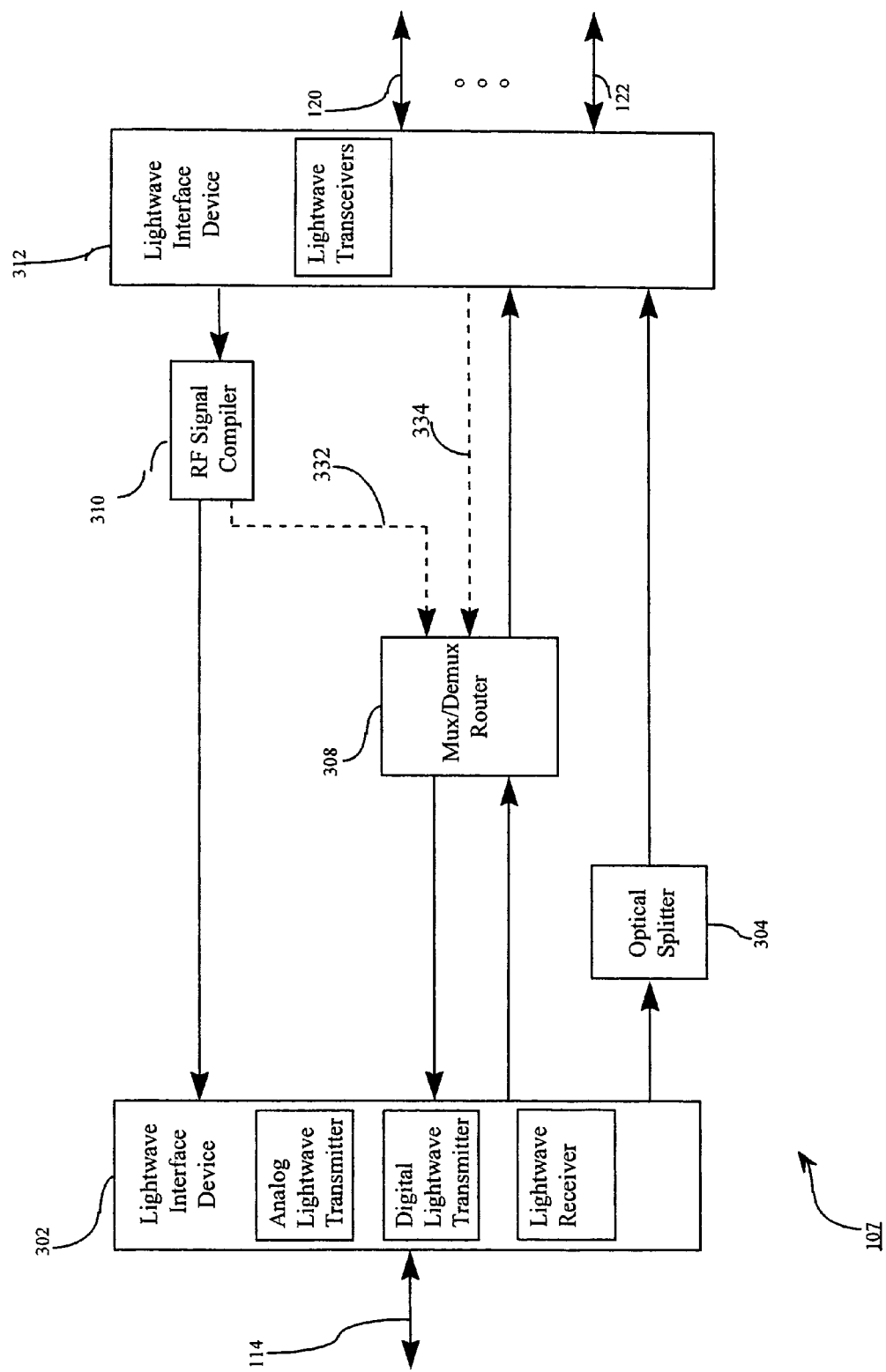
FIG. 4 shows a second exemplary block diagram of the mux-node.

FIG. 4 shows an exemplary functional block diagram of a third example of the mux-node 104 (herein referred to as the third mux-node 107). The third mux-node 107 includes a lightwave interface device 302 connected to the head-end 102 via the optical fiber trunk 114, an optical splitter 304, an RF signal compiler 310, a mux/demux/router 308 and a lightwave interface device 312. The lightwave interface device 302 includes an analog lightwave transmitter, a digital lightwave transmitter and a lightwave receiver. The lightwave interface device 312 includes lightwave transceivers for transmitting and receiving lightwaves from the optical fiber trunks 120–122.

The lightwave interface device 302 receives the first downstream signals from the head-end 102 and optically forwards the first downstream signals to the optical splitter 304. The optical splitter 304 may split the first downstream signals into separate first downstream signals destined for different mFNs 108, and forwards the separated first downstream signals optically to the mFNs 108 via the lightwave interface device 312.

The lightwave interface device 302 also receives the second downstream signals from the head-end 102. The lightwave interface device 302 converts the second downstream signals into an electrical signal and forwards the second downstream signals electrically to the mux/demux/router 308.

The mux/demux/router 308 demultiplexes the second downstream signals (digital signals) into separate second downstream signals corresponding to each of the destination end-users 112 based on a multiplexing scheme such as TDM, FDM with frequency conversion, etc., for example. TDM is used as an example in the following discussion. The demultiplexed second downstream signals are grouped into downstream signals destined to end-users 112 serviced by the same mFNs 108. The grouped downstream signals are sent to the lightwave interface device 312 for transmitting to the respective mFNs 108 via the optical fiber trunks 120–122.

If WDM is used for transmission between the mux-node 107 and the mFNs 108, one set of wavelengths may be allocated to each of the separated first downstream signals and another set of wavelengths may be allocated to end-users 112 that require downstream communications. Alternatively, the first downstream signals may be transmitted via one set of optical fibers and the second downstream signals transmitted via another set of optical fibers. In this case, at least two fibers connect each of the mFNs 108 to the mux-node 107.

When analog and digital upstream signals are received from the end-users 112 via the mFNs 108, the lightwave interface device 312 sends the received analog upstream signals as RF signals to the optional RF signal compiler 310 (if used). If RF digital signals are received, then the RF signal compiler 310 receives and converts the RF digital signals to digital base band signal and sends the digital base band signals to the mux/demux/router 308 via optional connection 332. If digital base band signals are received from the mFNs 108, then the received digital base band signals are sent directly to the mux/demux/router 308 via optional connection 334. The RF signal compiler 310 RF combines the analog upstream signals and sends the combined signals to the lightwave interface device 302 for transmission to the head-end 102. If the RF signal compiler 310 is not used, then the RF signals may be sent directly to the lightwave interface devices 302 to be transmitted using WDM, for example, to the head-end 102.

The mux/demux/router 308 may perform local routing functions. For example, the mux/demux/router 308 may examine the destination addresses of each of the digital upstream signals to determine if any of the upstream signals is directed to an end-user 112 that is serviced by the mux-node 107. The upstream signals that are destined to any of the end-users 112 serviced by the second mux-node 107 may be routed by the mux/demux/router 308 to the respective end-users 112 as returned second downstream signals without forwarding these upstream signals to the head-end 102.

The mux/demux/router 308 may perform routing functions in conjunction with the mFNs 108, for example. The mFNs 108 may perform initial examination of the upstream communication and label the communications so that the mux/demux/router 308 may route the communications based on the labels. The mFNs 108 and/or the mux/demux/router 308 may also assist routing functions performed by the head-end 102.

Those portions of the digital upstream signals that are not destined to the end-users 112 serviced by the mux-node 107 are multiplexed by using TDM, for example, and sent to the head-end 102 via the lightwave interface device 302. The lightwave interface device 302 may use WDM to transmit and receive upstream and downstream signals using one or more optical fibers of the optical fiber trunk 114, for example. Alternatively, multiple fibers may be used by allocating one or more optical fibers for analog transmissions and one or more other optical fibers for digital transmissions. Wavelengths may also be allocated among the available optical fibers, for example.

While FIGS. 2–4 show the mux-nodes 103–107 to include the optical splitters 303, 316 and 304 to be integrated with other mux-node components, the optical splitters 303, 316 and 304 may be packaged separately and physically placed in different geographic locations. For example, optical splitter 303 may receive lightwave signals directly from the trunk 114 and output lightwave signals directly to the the mFNs 108. Thus, FIGS. 2–4 show the mux-nodes 103–107 logically and the components of the mux-nodes 103–107 may not be co-located at one location. In the following discussion, reference to the mux-node 104 refers to any one of the mux-nodes 103–107 as appropriate based on the context. Explicit identification of a particular mux-node 103–107 will be used where important.

Figure 5:
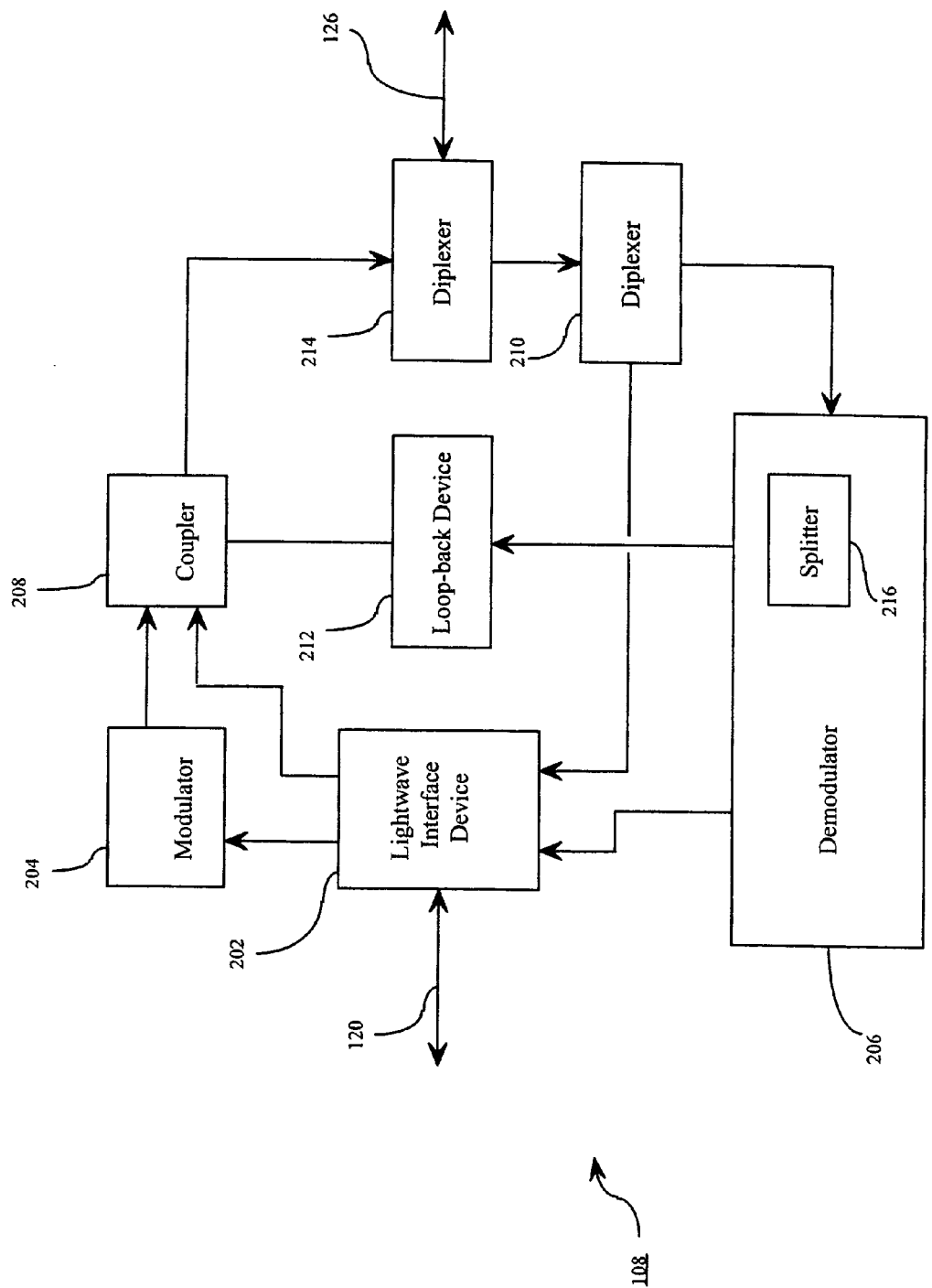
FIG. 5 shows an exemplary block diagram of a mFN.

FIG. 5 shows an exemplary block diagram of a mFN 108 (connected to the optical fiber trunk 120, for example). The mFN 108 includes a lightwave interface device 202, a modulator 204, a coupler 208, diplexers 210–214, and a demodulator 206. Communication signals are exchanged between the mux-node 104 and the mFNs 108 via the optical fiber trunk 120 and the lightwave interface device 202. The optical fiber trunk 120 may have a single fiber supporting multiple full duplex communication channels by using WDM, for example. The lightwave interface device 202 separates the first and second downstream signals. The first downstream signals (analog signals) are sent to the diplexer 214 via the coupler 208. The second downstream signals are sent to the modulator 204 which modulates the second downstream signals into radio frequency (RF) signals at appropriate frequencies. The first and second downstream signals are combined in the coupler 208 and sent to the end-users 112 via the wired connection 126.

An optional loop-back signal generated by an optional loop-back device 212 (shown as a dashed box) may also be combined by the coupler 208 with the modulator output signals. The output of the coupler 208 is input to the diplexer 214 which outputs the signals received from the coupler 208 to the wired connection 126 (e.g., a coaxial cable). The taps 110 are connected to the connection 126 and the end-users 112 receive and transmit downstream and upstream signals via the taps 110.

The upstream communication signals from the end-users 112 are received by the mFNs 108 via the connection 126 and the diplexer 214. The diplexer 214 directs the received upstream communication signals (which are RF signals) to the diplexer 210 which separates two RF frequency bands. A first frequency band may be allocated to a first set of upstream signals and a second frequency band may be allocated to a second set of upstream signals. The first frequency band may be between 5–40 MHz and the second frequency band may be between 930 and 1000 MHz or vice versa. The diplexer 210 sends the first frequency band signals to the lightwave interface device 202 for transmission to the mux-node 104 and the second frequency band to the demodulator 206. The demodulator 206 may demodulate the digital upstream signals to digital base band signals and output the demodulated signals to the lightwave interface device 302 for transmission to the head-end 102 via the optical fiber trunk 120. Signals of the first and second bands may be transmitted together over the same optical fiber or separately over different optical fibers of the optical fiber trunk 120.

The mFN 108 may support either local, distributed or centralized MAC. If centralized MAC is implemented, upstream media access requests are forwarded to the head-end 102 through the demodulator 206, the lightwave interface device 202 and the mux-node 104. For this case, the loop-back device 212 may not be required. If local MAC is implemented, local access signals may be out-of-band and thus are not modulated together with other communication signals. For this case, the local access signals may be split out by an optional splitter 216 (shown as a dashed box) and forwarded to the loop-back device 212. The loop-back device 212 then performs any local access contention/control functions that may be desired and forwards loop-back signals to the coupler 208 to be combined with the signals received from the head-end 102 and returned to the end-users 112 via the diplexer 214. If distributed MAC is implemented, the mFN 108 may partially process the media access requests and forward the processed requests to the mux-node 104 for further processing. For example, the mFN 108 may indicate a priority or privilege that was assigned to the mFN 108 for MAC purposes.

If the local access signals are modulated together with other upstream communication signals, the signals received from the diplexer 210 are first demodulated by the demodulator 206 and the local media access signals are separated out as the loop-back signals (out-of-band or in-band signals) and sent to the loop-back device 212. For this case, the splitter 210 may not be required. The loop back device 212 may generate out-of-band loop-back signals which are returned to the end-users 112 via the coupler 208 and diplexer 214 if local MAC is used. Alternatively, the loop back device 212 may be directly connected to the modulator 204 (this connection not shown) and the loop back signal may be inserted into the downstream signal by TDM, for example, with the downstream data. This alternative generates an in-band loop back signal. There may be many other ways of implementing MAC as is known to one or ordinary skill in the art.

Figure 6:
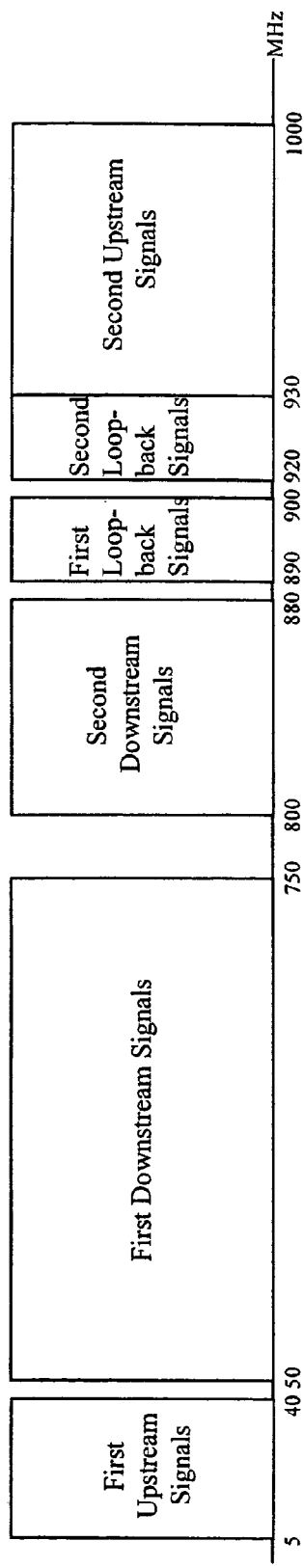
FIG. 6 shows an exemplary RF frequency band allocation for mFN wired connection.

FIG. 6 shows an exemplary band allocation for the passive wired connection 126 of the mFN 108. The first downstream signals (e.g., analog broadcast signals) may be transmitted within a band between 50 and 750 MHz and the second downstream communication signals (e.g., digital signals on sub-carriers) may be transmitted within a band between 800 and 880 MHz, for example. The upstream signals may be transmitted in two bands between 5–40 MHz (e.g., analog upstream signals) and between 930 and 1000 MHz (e.g., second upstream signals). The loop-back upstream and downstream signals may be transmitted in the bands 920–930 MHz and 890–900 MHz, respectively. The loop-back upstream signal may be modulated together with the second upstream signals so that the second upstream band may range between 920 and 1000 MHz.

Figure 7:
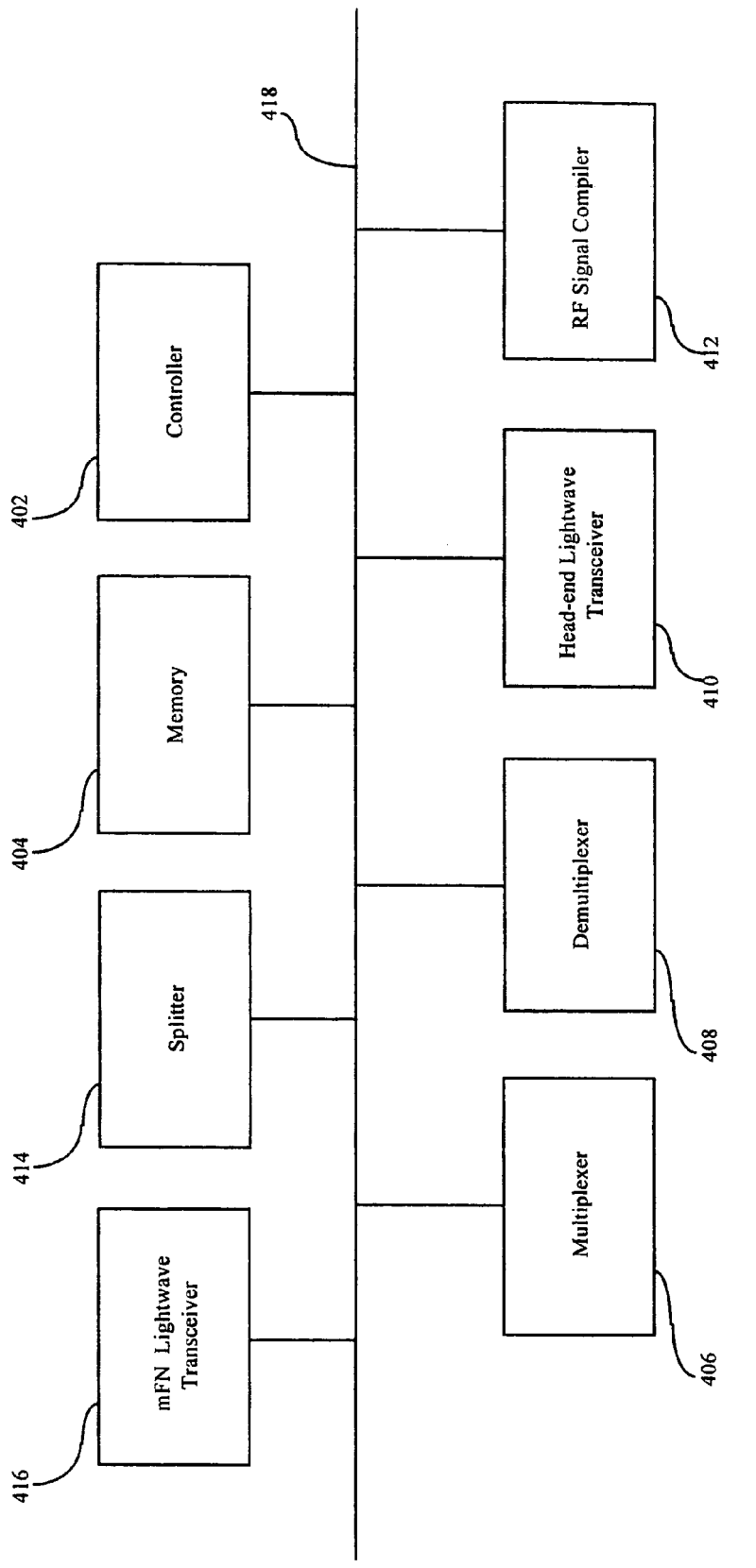
FIG. 7 shows an exemplary block diagram of the mux-node.

FIG. 7 shows an exemplary block diagram of the mux-node 104. The mux-node 104 may include a controller 402, a memory 404, a multiplexer 406, a demultiplexer 408, a head-end lightwave interface device 410, an optional RF signal compiler 412, a splitter 414 and a mFN lightwave interface device 416. The above components may be controlled via a control signal bus 418. Data are passed among the above elements as illustrated in FIGS. 2–4 and are omitted from FIG. 7 to avoid confusion.

While the above illustrates the mux-node 104 via a specific bus orientated architecture, other type architectures and implementations may be used as are well known to one of ordinary skill in the art. In addition, the above components may be implemented by available hardware technologies such as PLAs, PLDs, PALs, gate arrays, etc. for digital components as well as hybrids and other analog integrated circuits for non-digital components.

Digital communication signals are received from the head-end 102 in the head-end lightwave interface device 410 and forwarded to the splitter 414. The splitter 414 separates the communication signals into the first and second downstream signals. The first downstream signals may be sent to the mFN lightwave interface device 416 for transmission to particular mFNs 108 based on destinations of the first downstream signals, for example. The controller 402 may direct the first downstream signals to different ones of the mFNs 108 based on information contained in the first downstream signals such as labels and repackage the first downstream signals tailored for each of the mFNs 108. The controller 402 may store a portion of the first downstream signals in the memory 404 to serve as a cache for distribution to the mFNs 108 based on future requests, for example.

The second downstream signals are demultiplexed by the demultiplexer (e.g., TDM) and sent to the controller 402. The controller 402 may examine the demultiplexed second downstream signals for destination addresses and identifies the appropriate mFNs 108 based on end-user addresses serviced by the mFNs 108. For example, if the second downstream signals are in the form of data packets, the controller 402 examines headers of the data packets to determine the destination addresses. Based on address assignment information stored in the memory 404, for example, the controller 402 determines which of the mFNs 108 should receive the data packets for forwarding to the destination end-users 112. The controller 402 outputs the data packets to the appropriate mFNs 108 via the mFN lightwave interface device 416.

As with the first downstream signals, the controller 402 may process the second downstream signals based on information other than the destination address. For example, information in the header of data packets may include repackaging or caching instructions from the head-end 102. Thus, the controller 402 may perform many functions to process the first and second downstream signals for providing efficient and convenient service to the end-users 112.

Digital upstream signals are received from the mFNs 108 via the mFN lightwave interface device 416. If RF digital signals are received, then these signals are sent to the RF signal compiler 412 for conversion into digital base band signals before sending the signals to the controller 402. The controller 402 examines the upstream signals to determine whether any of the upstream signals are destined to end-users 112 serviced by the mux-node 104. For example, if the upstream signals are data packets (data packets are used only as an example), the controller 402 examines the header of the data packets and determines whether the data packets are destined to end-users 112 reachable through one of the mFNs 108 that is connected to the mFN lightwave interface device 416. If reachable, the controller 402 may direct the data packets to the proper mFNs 108 via the mFN lightwave interface device 416.

If the data packets are destined to other than the end-users 112 not reachable via one of the mFNs 108, the controller 402 sends the data packets to the multiplexer 406. The multiplexer 406 multiplexes the data packets for transmission to the head-end 102. The multiplexer may multiplex the data packets using TDM, for example, and forward the multiplex signals to the head-end lightwave interface device 410. If multiplexing is not required, then the data packets are sent directly to the lightwave interface device 410 for transmission to the head-end 102.

Analog upstream signals are also received from the mFNs 108 via the mFN lightwave interface device 416 as RF signals. The mFN lightwave interface device 416 sends the analog upstream signals to the optional RF signal compiler 412 which combines the analog upstream signals from all the mFNs 108 and sends the combined signal to the head-end lightwave interface device 410 for transmission to the head-end 102. If the RF signal compiler 412 is not used, then the RF analog signals are sent directly to the head-end lightwave interface device 410 for transmission to the head-end 102.

Figure 8:
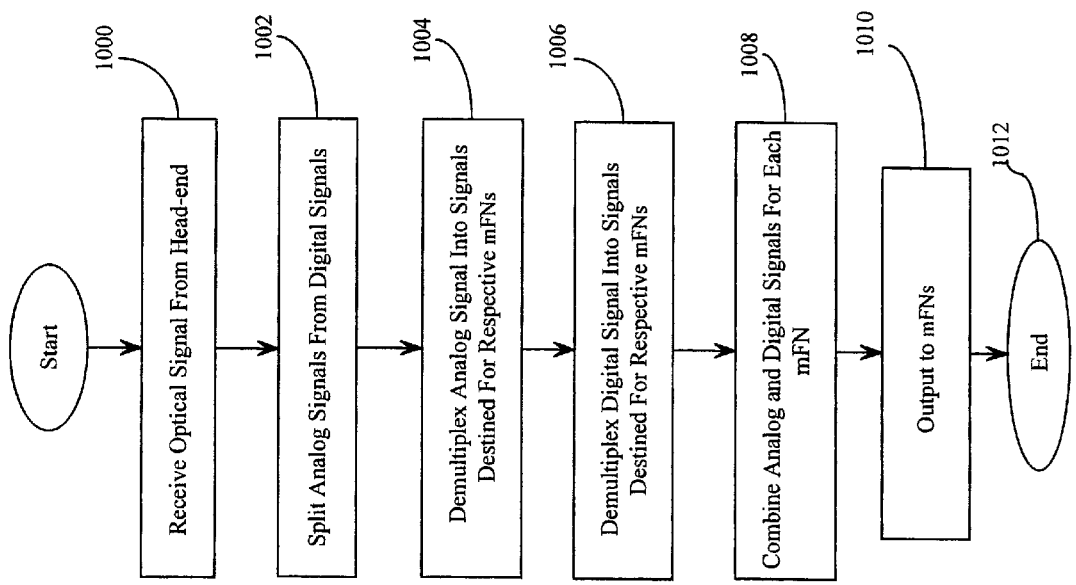
FIG. 8 shows an exemplary flow chart for the downstream communication process of the mux-node.

FIG. 8 shows an exemplary flowchart of a process of the mux-node 104. In step 1000, the head-end lightwave interface device 410 receives optical signals from the head-end 102, converts the optical signals to electric signals and forwards the electrical signals to the splitter 414. Then the process goes to step 1002. In step 1002, the splitter 414 splits the first downstream signal from the second downstream signal and sends the second downstream signal to the demultiplexer 408. Then the process goes to step 1004. In step 1004, the splitter 414 further splits the first downstream signal into separated first downstream signals destined for respective mFNs 108 and sends the separated first downstream signals to the mFN lightwave interface devices 416. Then the process goes to step 1006.

In step 1006, the demultiplexer 408 demultiplexes the second downstream signal (e.g., using TDM) and sends the demultiplexed second downstream signals to the controller 402. The controller 402 groups the demultiplexed second downstream signals for specific mFNs 108 based on the end-users 112 serviced by the mFNs 108 and the destination addresses of the demultiplexed second downstream signals. Then the process goes to step 1008. In step 1008, the mFN lightwave interface device 416 converts for each of the mFNs 108 the first and second downstream electrical signals into appropriate optical signals using WDM, for example. Then the process goes to step 1010. In step 1010, the mFN lightwave interface device 416 output the optical signals to each of the mFNs 108, and the process goes to step 1012 and ends.

Figure 9:
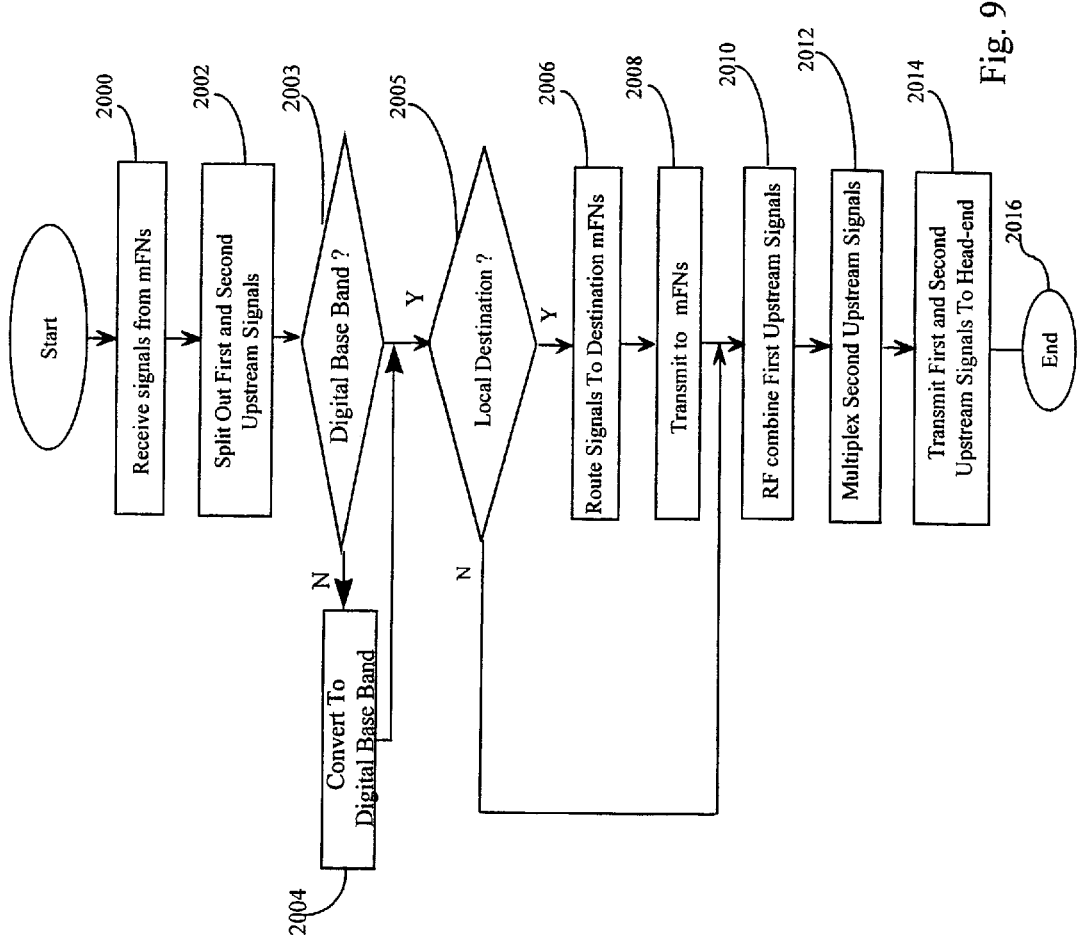
FIG. 9 shows an upstream communication process of the mux-node.

FIG. 9 shows an exemplary flow chart for a process of the mux-node 104 for receiving signals from the mFNs 108. In step 2000, the mFN lightwave interface device 416 receives upstream signals from the mFNs 108. Then the process goes to step 2002. In step 2002, the mFN lightwave interface device 416 splits out the first and second upstream signals and the first upstream signals are sent to the optional RF signal compiler 412. Then the process goes to step 2003. In step 2003, the process determines whether the second upstream signals are digital base band signals. If digital base band signals, then the second upstream signals are sent to the controller 402 and the process goes to step 2005; otherwise, the process goes to step 2004. In step 2004, the RF signal compiler 310 converts the second upstream signals to digital base band signals and sends the digital base band signals to the controller 402, and the process goes to step 2005. Steps 2003 and 2004 are bypassed if the RF signal compiler 310 is not used. In this case, the second upstream signals are assumed to be digital base band signals.

In step 2005, the controller 402 determines whether any of the second upstream signals are destined to end-users 112 that are serviced by the second mux-node 104. If some of the second upstream signals are so destined, the process goes to step 2006; otherwise the process goes to step 2010. In step 2006, the controller 402 routes those second upstream signals destined to end-users 112 serviced by the second mux-node 104 to the mFN lightwave interface device 416 as returned downstream signals for transmission to the destination end-users 112. Then the process goes to step 2008. In step 2008, the mFN lightwave interface device 416 transmits the returned downstream signals to the respective end-users 112 via appropriate mFNs 108. Then the process goes to step 2010.

In step 2010, the RF signal compiler 310 converts the first upstream RF signals by combining the RF signals and sends the combined first upstream signals to the head-end lightwave interface device 410. The step 2010 is by-passed if the RF signal compiler 310 is not used. Then the process goes to step 2012. In step 2012, the controller 402 sends the second upstream signals that are not returned to destination end-users 112 to the multiplexer 406 which multiplexes these second upstream signals using TDM, for example, and sends the multiplexed second upstream signals to the head-end lightwave interface device 410. Then the process goes to step 2014. In step 2014, the head-end lightwave interface device 410 transmits the combined first upstream signals and the second upstream signals to the head-end 102 using WDM, for example. Then the process goes to step 2016 and ends.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A communication system, comprising:
a mux node including a first lightwave interface device for communication with a head end, said mux node further including a second lightwave interface device for transmitting a plurality of optical signals, wherein at least two of the optical signals include both analog and digital signals, wherein said mux node includes a radio frequency signal compiler that enables frequency division multiplexing of a plurality of upstream signals received from a corresponding plurality of mini fiber nodes, where at least one of said plurality of upstream signals is transmitted directly to at least one of said plurality of mini fiber nodes without being forwarded to said head end; and
a mini fiber node including a third lightwave interface device for receiving said optical signals from said second lightwave interface device of said mux node, said mini fiber node being further configured to communicate analog and digital signals to end user equipment via a wired connection.

2. A network node that communicates between a head end and a plurality of mini fiber nodes, comprising:
a first lightwave interface device for communication with a head end;
a second lightwave interface device for transmitting a plurality of optical signals to a respective plurality of mini fiber nodes, wherein each of the plurality of mini fiber nodes being configured to communicate analog and digital signals to end user equipment via a wired connection, wherein at least two of the optical signals include both analog and digital signals; and
a radio frequency signal compiler that enables frequency division multiplexing of a plurality of upstream signals received from a corresponding plurality of mini fiber nodes, where at least one of said plurality of upstream signals is transmitted directly to at least one of said plurality of mini fiber nodes without being forwarded to said head end.

* * * * *